United States Patent [19]

Harris

[11] Patent Number: 4,901,612
[45] Date of Patent: * Feb. 20, 1990

[54] BAND SAW APPARATUS AND METHOD WITH PRESSURE CONTROLLED FEED

[76] Inventor: Gerald R. Harris, P.O. Box 1148, Pryor, Okla. 74362

[*] Notice: The portion of the term of this patent subsequent to Dec. 17, 2002 has been disclaimed.

[21] Appl. No.: 48,908

[22] Filed: May 12, 1987

Related U.S. Application Data

[63] Continuation-in-part of Ser. No. 609,429, May 11, 1986, Pat. No. 4,766,790, which is a continuation-in-part of Ser. No. 577,527, Feb. 6, 1984, Pat. No. 4,558,614.

[51] Int. Cl.[4] .................. B23D 55/04; B23D 55/08
[52] U.S. Cl. .......................... 83/56; 83/72; 83/789; 83/796; 83/801
[58] Field of Search ............... 83/13, 56, 72, 74, 76, 83/71, 789, 796, 797, 798, 799, 801, 811, 812

[56] References Cited

U.S. PATENT DOCUMENTS

| | | |
|---|---|---|
| Re. 25,901 | 11/1965 | Whitmore . |
| 2,549,236 | 4/1951 | Rathert et al. . |
| 2,602,987 | 7/1952 | Wells . |
| 3,682,030 | 8/1972 | Harris .................. 83/168 |
| 3,715,946 | 2/1973 | Kaltenbach .............. 83/72 |
| 3,752,022 | 8/1973 | Demurger ............... 83/13 |
| 4,023,448 | 5/1977 | Bertini ................. 76/112 |
| 4,117,756 | 10/1978 | Harris ................. 83/801 |
| 4,127,045 | 11/1978 | Blucher et al. ......... 83/796 |
| 4,160,397 | 7/1979 | Bertini ................ 83/661 |
| 4,195,543 | 4/1980 | Tapply et al. .......... 83/794 |
| 4,205,571 | 6/1980 | Bertini ................ 83/661 |
| 4,369,861 | 1/1983 | Sugimoto .............. 83/801 |
| 4,423,653 | 1/1984 | Howard ................ 83/820 |
| 4,432,260 | 2/1984 | Sarurai et al. ......... 83/13 |
| 4,437,367 | 3/1984 | Hauser ................ 83/13 |
| 4,478,120 | 10/1984 | Sugimoto .............. 83/71 |
| 4,481,845 | 11/1984 | Sakurai et al. ......... 83/13 |
| 4,481,849 | 11/1984 | Aoyagi ................ 83/796 |
| 4,487,097 | 12/1984 | Hara et al. ........... 83/56 |
| 4,534,247 | 8/1985 | Taguchi ............... 83/13 |
| 4,546,682 | 10/1985 | Howard ................ 83/13 |
| 4,557,168 | 12/1985 | Tokiwa ................ 83/56 |
| 4,558,614 | 12/1985 | Harris ................ 83/56 |
| 4,579,264 | 4/1986 | Tsune ................. 83/13 |
| 4,766,790 | 8/1988 | Harris ................ 83/56 |

FOREIGN PATENT DOCUMENTS 2330023 1/1974 Fed. Rep. of Germany .
137786 4/1978 Japan .

OTHER PUBLICATIONS

"Rocking saw blade eases high-tech metal cutting", Metal Center News, Aug, 1984, pp. 56-60.

Primary Examiner—Hien H. Phan
Attorney, Agent, or Firm—Flehr, Hohbach, Test, Albritton & Herbert

[57] ABSTRACT

Band saw apparatus is disclosed which includes cutting enhacement apparatus formed for tilting of the cutting stretch of the band saw blade to vary the force per unit area of the cutting edge of the blade on the workpiece. The cutting enhancement apparatus which tilts the blade at both guide assemblies is shown. The saw carriage is movably mounted to the remainder of the saw to be substantially free to rebound or move away from the workpiece during tilting of the blade to avoid digging in or shearing off of the blade teeth and to permit close spacing of the blade guides next to the workpiece. The saw includes a feed control system having both an orifice control circuit and a support force control circuit. A method is disclosed which is comprised of using the support force circuit to vary the rate of cutting during the cut to prevent overloading of the blade and/or stalling of the machine. Sensors feedback signals which adjust the support force circuit to control feeding.

18 Claims, 4 Drawing Sheets

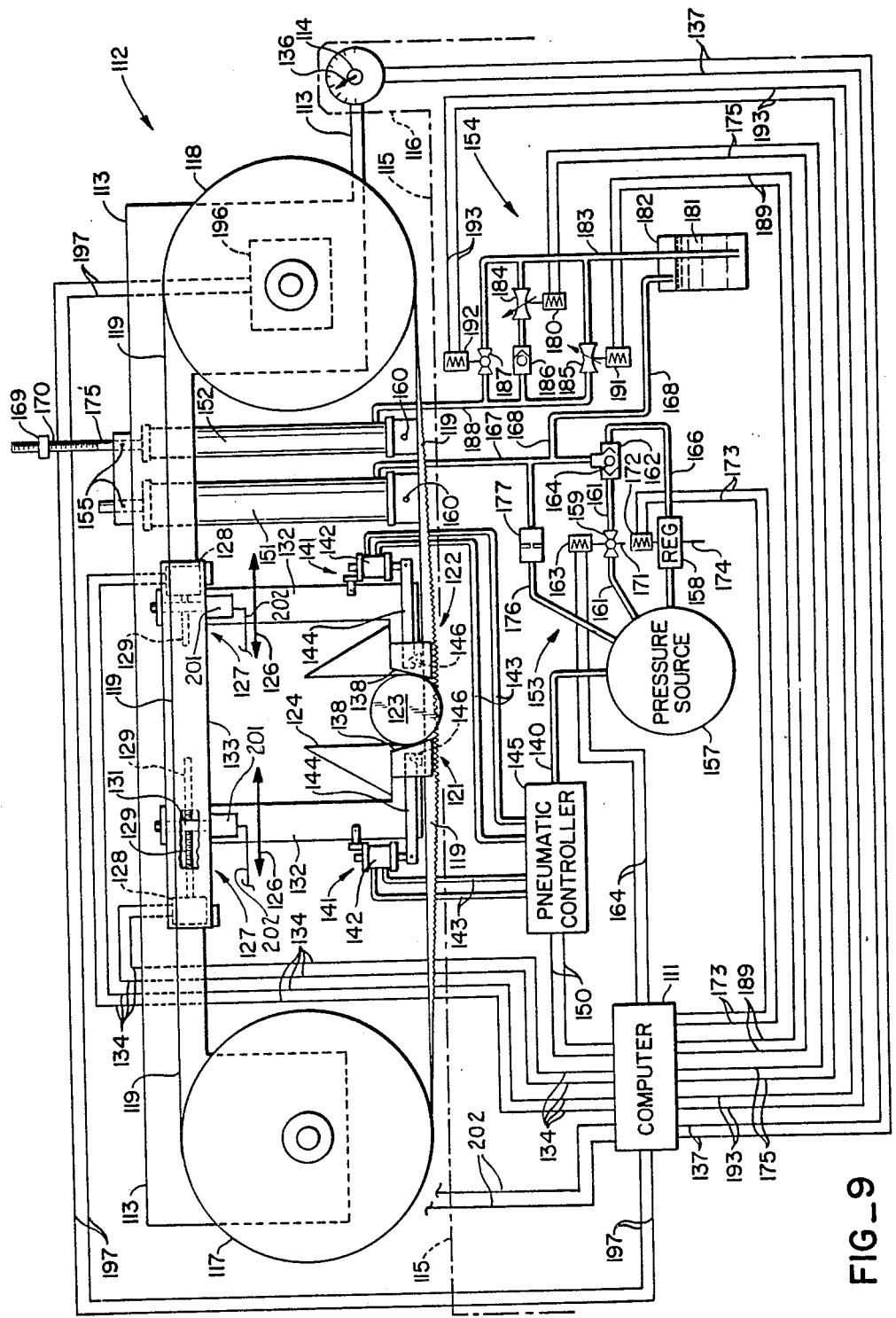
FIG_9

BAND SAW APPARATUS AND METHOD WITH PRESSURE CONTROLLED FEED

RELATED APPLICATIONS

This application is a continuation-in-part application based upon co-pending application Ser. No. 609,429, filed May 11, 1986, and entitled "Band Saw Apparatus And Method" now U.S. Pat. No. 4,766,790, which application was a continuation-in-part of application Ser. No. 577,527, filed Feb. 6, 1984, entitled "Band Saw Apparatus And Method", now U.S. Pat. No. 4,558,614.

TECHNICAL FIELD

The present invention relates, in general, to band saw apparatus suitable for cutting relatively hard metal workpieces and, more particularly, relates to a band saw apparatus and a method in which advancement of the saw blade through the workpiece is enhanced and controlled.

BACKGROUND ART

In recent years considerable effort has been directed toward enhancing the cutting efficiency and precision of band saws when cutting hard metallic workpieces. One broad approach to the problem has been to employ a cutting enhancer which either tilts and/or impresses an impulse on the saw blade periodically during the cut. Another broad approach has been based upon use of the band saw feed mechanism alone, or together with feedback sensing devices, to control the feed rate at which the blade is advanced through the workpiece.

A. Tilting and Impulse Cutting Enhancer Systems.

Cutting enhancers usually are employed in connection with sawing very hard metallic workpieces, and they tilt and/or impulse the saw blade to improve cutting. Saw blade tilting results in a periodic reduction in the area of the workpiece being cut with an attendant increase in the localized pressure of the teeth against the workpiece for any given force on the saw blade. This area decrease produces greater penetration of the teeth into the metal and reduces cutting times. Similarly, an impulse to the back of the saw blade will increase the pressure of the teeth to the workpiece to drive the teeth into the metal to a greater depth than occurs when a constant pressure is maintained. Such saw blade tilting and impulsing has been accomplished in band saws by a number of different cutting enhancer apparatus.

1. Specially Formed Blades.

One approach is to provide a specially formed band saw blade having a height dimension which varies along the length of the blade. Typical of such efforts are the saw blades set forth in U.S. Pat. Nos. 4,423,653 to Howard, 4,205,571 to Bertini, 4,195,543 to Tapply et al., 4,160,397 to Bertini and 4,023,488 to Bertini. The rocking action of the blade disclosed in U.S. Pat. 4,423,653 is also the subject of an article entitled "Rocking saw blade eases high-tech metal cutting," Metal Center News, Aug., 1984, pp.56–60.

In most cases such specially formed band saw blades are formed to reduce the area being engaged by the saw teeth by tilting or see-sawing the blade as it is advanced. Alternatively, such blades are formed to apply an impulse to the workpiece as the weight of the saw arm is periodically brought to bear upon the blade.

Specially formed blades, however, are expensive to manufacture, are repeatedly stressed in the same locations along the blade and have inherent limitations in the ability to vary the frequency and amplitude of the tilting of the impulses.

2. Tilting Saw Frame.

Another approach to enhancement of band saw cutting is to tilt the saw carriage or frame assembly. In U.S. Pat. No. 4,546,682 to Howard a band saw is disclosed in which the pivotal arm of the saw includes a powered eccentric mounting assembly. The eccentric rocks the carriage or arm to repetitively tilt the saw blade slightly during cutting. Similarly, in U.S. Pat. No. 4,579,026 to Tsune, U.S. Pat. No. 4,487,097 to Hara et al., U.S. Pat. No. 4,478,120 to Sugimoto, U.S. Pat. No. 4,369,686 to Sugimoto and Japanese Patent No. 54-137786 the entire drive wheel carriage or frame assembly is tilted to roll or tilt the blade with respect to the workpiece during the cut. Such tilting-carriage saws, however, have the disadvantage of requiring movement of the entire mass of the saw arm, with the inherent inertial limitations and the necessary complexity of the arm mounting structure.

3. Blade Displacement At One Guide.

Still a further approach to band saw blade tilting and/or impulse generation has been to displace the blade at one of the blade guide assemblies. Typical of such apparatus are the band saws disclosed in U.S. Pat. No. 4,546,682 to Howard and U.S. Pat. No. 4,127,045 to Blucher.

In U.S. Pat. No. 4,546,682 to Howard, a band saw blade tilting mechanism is disclosed in which the blade guide assembly farthest from the pivotal arm is provided with a blade displacement assembly. Displacement of the blade at the assembly changes the angle of the blade with respect to the workpiece without having to tilt the entire mass of the saw arm. The change in the angle of displacement is relatively limited, however, and the center of pivoting of the blade takes place about the other blade assembly (the one nearest the pivot for the arm) not about the workpiece itself. The reaction bounce or displacement upwardly of the arm when the blade is displaced down using such an enhancer, therefore, is undesirably high.

U.S. Pat. No. 4,127,045 to Blucher also employs a blade displacement assembly mounted to the blade guide farthest from the pivotal mount of the saw arm. In this patent the blade displacement mechanism is a step cam and follower that is formed to rapidly and repeatedly displace the saw blade toward, and permit movement away from, the workpiece. As the cam pushes the blade toward the workpiece and saw table, the blade flexes between the blade guides and the workpiece because the arm feed cylinder resists reaction displacement of the arm upwardly. The guides in U.S. Pat. No. 4,127,045 are widely spaced from the workpiece which will permit blade flexure. Displacement of the blade toward the work table by one guide does change the angle of engagement of the saw blade with the workpiece slightly to effect tilting during cutting, but the enhanced cutting is achieved primarily by the effect of the mass of the saw arm pounding or providing an impulse on the back of the blade.

4. Miscellaneous Blade Tilting Apparatus.

Additionally, hack saws have employed tilting of the saw blade to enhance cutting efficiency. MARVEL brand hack saws, produced by Armstrong-Blum Manufacturing Co. of Chicago, Ill., for example, have for many years used a "Roll Stroke" blade motion which progressively raises one end of the saw blade while lowering the other as the blade is drawn through the work. This action is repeated for each saw stroke over the full cut of the workpiece. Similarly, German Pat. No. 2,330,023 discloses a hack saw in which the blade is repetitively tilted during cutting. U.S. Pat. No. 2,549,236 to Rathert et al. discloses a log bucking chain saw apparatus which includes an assembly for raising and lowering a remote end of the saw to enable the operator to rock the saw with the handle end to maximize cutting efficiency.

5. Affect of Feed System on Cutting Enhancer Operation.

Band saw blade tilting structures which produce a rapid change in angle or which apply an impulse to the blade, cause the saw blade teeth to be displaced into the workpiece only to a small degree before there is a reaction force which moves the saw arm (or drive wheel support frame) away from the workpiece. Thus, after some initial set or small penetration of the teeth into the work, the remainder of the attempted blade displacement tends to produce saw blade flexure and upward movement of the saw arm away from the workpiece. Since band saws typically include a pneumatic or hydraulic feed cylinder with associated control circuits and feed linkages which control the rate at which the saw is advanced through the workpiece, the feed cylinder and control circuit can act as a constraint against free movement of the band saw.

In some saws the feed cylinder and control circuitry will not let the arm back away rapidly from the workpiece to accommodate the reaction bounce which occurs as the saw blade is tilted or impulsed. This limitation in the arm movement will cause the saw blade to bend and to be stressed. In other saws, the feed assembly will allow the saw to move away from the workpiece, but will not allow a rapid return toward the workpiece as the blade is advanced and cuts into the workpiece. If the return of the saw arm toward the workpiece is at a rate which is greater than the feed rate of the saw, the feed cylinder and control circuit retard the arm movement of the saw arm back toward the workpiece. Such retarding or slowing of the saw arm movement results in a dramatic reduction in cutting force while the saw arm tries to catch up to the blade displacement. In the extreme, the force will be zero and stressful bouncing and bending of the blade will occur. This cutting force reduction reduces cutting efficiency during part of the cutting process, although the overall efficiency still may be improved as a result of the periodic decrease in area effected by tilting the saw blade or the effect of the impulse driving the teeth into the workpiece.

Although not specifically recognized in the prior art, the effect of the feed cylinder constraint on saw arm reaction has been accommodated in one of two ways. First, the height variation produced by tilting of the blade can be selected so that it is not substantially greater than the depth to which the teeth can be initially set or driven into the work. The disadvantage of this "solution" is that it does not maximize cutting efficiency. A second approach is to spread the blade guides from the workpiece sufficiently to enable bending of the saw blade along the longitudinal axis of the blade to accommodate feed cylinder restraint in either the movement toward or away from the workpiece. This "solution," however, results in bowing of the blade and produces angular variations which reduce the tilting effect. Moreover, it can fatigue the blade, and it will cause wandering of the blade as it cuts through the work. The amount of deviation of the saw blade from a straight line cut, for example, is proportional to the third power of the separation of the guides from each other.

If the blade guides are set next to the workpiece so that blade bending is minimized, and if the tilting variation is too great, feed cylinder constraint will cause the teeth to dig into the workpiece to a degree which will either stop the saw or shear off the teeth from the blade.

Ideally, the best cutting efficiency is obtained when blade tilting, or the impulse on the blade toward the workpiece, is sufficient to cause the teeth to be urged into the workpiece beyond the initial set to just short of digging in, which would stop the saw or shear the teeth. For maximum efficiency in the cutting of a hard metallic material, the teeth should be forced into the material until they start to dig in and pull a chip, and then the teeth should be released before shearing or stalling of the saw. Moreover, the cutting pressure, or force per unit area engaged by the teeth, should be applied and maintained at a substantially constant level, below the pressure which will cause the teeth to dig in, for as long as possible during the entire blade tilting cycle.

B. Band Saw Feed Systems.

Various approaches to feeding the band saw blade through the workpiece also have been employed to attempt to improve cutting efficiency. Often such feeding techniques are combined with sensors which feedback control signals that are used to vary the feed rate in response to dynamic operating conditions of the saw.

Several problems are commonly encountered which influence band saw feeding to a substantial degree. First, when the cross section of the workpiece (the dimension of the workpiece along the blade) varies, the feed rate also should be varied. Round bar stock, for example, has a width or transverse dimension which varies substantially with the depth of cut. It is highly desirable, and known in the prior art, to vary the feed rate of a band saw over the depth of the cut in order to match the feed rate to the changes in workpiece cross section.

A second problem is that non-homogeneous materials will cause the resistance to cutting to change, even though the cross section remains constant. Another factor is the progressive dulling of the band saw blade. As the blade becomes more dull, the resistance to cutting, and horsepower required to drive the blade, may actually decrease. Feed systems based upon cutting resistance or constant horsepower may actually slow the feed rate as the blade dulls, instead of increase it. Additionally, the feeding force on the band saw blade should not be so great as to cause the blade to wander or deflect laterally from its nominal cutting position.

As above set forth, the operation of a tilting-type or an impulse type of cutting enhancer also will be affected by the feed system. Moreover, the type of blade and particularly the number of teeth engaging the workpiece can substantially limit band saw feed rates.

In order to understand the influence of these and other factors on band saw feed systems, the various types of prior art feed systems and their use to try to overcome these problems is briefly set forth.

A conventional band saw feed control apparatus includes a fluid cylinder which can be used to elevate the saw arm, with the rate of descent being controlled by flow of the working fluid out of the cylinder to atmosphere (pneumatic systems) or to tank (hydraulic systems). Analogous electromechanical systems have been provided in which arm descent is controlled by a motor or by friction and/or a mechanical resistance.

1. Gravity Feeding.

Perhaps the most basic system is to employ a system with no feed rate control at all. The saw arm is free to fall under the influence of gravity, and the cutting resistance provided by the workpiece limits the rate of advancement through the work.

Gravity feeding depends upon a fortuitous match of the saw blade arm and the workpiece. If the arm is too light, cutting proceeds too slowly. If the arm is too heavy, which is typically the case, gravity feeding can break the blade and/or stall the saw.

A variation on gravity feeding is to provide add a lift cylinder, with return of fluid from the cylinder being controlled by a valve or orifice of fixed size. The orifice size, therefore, can be matched to some degree to the arm weight, but the system still lacks flexibility.

2. Adjustable and Variable Feed Systems.

In order to provide more control of band saw feeding, means for adjusting either the force and/or the orifice size in band saw feed control circuits were provided. Initially, such adjustments were manually set by an operator at the start of a cut and adjusted by the operator if workpieces of differing cross section were to be cut or if the saw blade became dull. More recently, adjustable feed rate controls have become variable feed rate controls in which feedback from various sensors on the band saw are used, often with the aid of a computer, to vary the feed rate during the cutting or feeding process. As used herein, the expression "adjustable" shall refer to systems in which the feed rate can be changed, but such changes or adjustments are made prior t a cut. Feed systems which are changed or varied during the cut are referred to as "variable" feed rate systems.

a. Fixed Force, Adjustable Orifice Systems.

Typical of a fixed force, adjustable orifice, band saw feed system is the band saw of U.S. Pat. No. 2,602,987 to Wells. The operator can adjust the orifice size to roughly match the feed rate to the geometry and material of the particular workpiece being cut, but such adjustment usually occurs before the start of the cut. The feed control assembly also includes means for sensing resistance to cutting which will stop feeding when the blade is deflected and resume feeding when the deflection returns to the normal range. In operation, therefore, the Wells system has a adjustable orifice which is preset and then essentially acts as a fixed orifice, fixed force system with intermittent feeding used to prevent feeding too fast.

Similarly, U.S. Pat. No. 4,481,849 to Aoyagi discloses a fixed force, adjustable orifice feed control system with apparatus for controlling raising and descent of the saw relative to the top of the workpiece to reduce cutting cycle time.

b. Adjustable Force, Fixed Orifice Systems.

In addition to the saws in the patent literature, there have been commercially available, prior art, band saws in which the orifice size has been fixed and the force on the working fluid can be adjusted. As is the case with adjustable orifice machines, such adjustable force machines were usually operated by making the adjustments prior to, not during, the cut.

c. Adjustable Force, Adjustable Orifice Systems.

There are a number of commercially available band saws having feed systems in which both the support force (net arm weight) and the orifice size are adjustable. U.S. Pat. No. Re. 25,901 to Whitmore is an example of such a system, but Whitmore also varies the orifice during cutting and is discussed below. Typically these saws are operated by adjusting the orifice size to produce a descent rate for the arm which is slow enough so that the saw will not cut thin workpiece cross sections so fast as to stall the saw or break the blade. The force is adjusted to be substantial enough to take over control the rate of descent or cutting in thick sections.

When cutting a workpiece having a round cross section, the orifice prevents run away of the saw when the workpiece cross section is so small that the workpiece cannot support the weight (force) of the arm. As the area of the workpiece increases, more total weight of the arm is supported by the workpiece and the rate of cutting of the saw slows. Once in the think section, the force setting essentially controls the cutting rate since the saw arm descent rate has slowed to a point that the orifice is having very little retarding effect on the arm. The net weight established by the force control cylinder is now being supported by the cutting resistance of the workpiece.

As the workpiece cross section decreases, the saw arm descent increases because the force per unit area of the blade on the workpiece is increasing. As the descent rate increases, the orifice progressively takes over and controls the descent rate to a greater and greater degree. Finally, the saw arm descent rate is limited by the orifice as the saw blade exits the workpiece.

The operator, therefore, will typically adjust the force cylinder to provide a net arm weight which will produce a cutting rate in thick sections that approaches the maximum rate for the saw blade and then adjust the orifice to prevent saw arm run away at entry and exit.

U.S. Pat. No. 3,752,022 to Demurger discloses a hydraulic feed system in which the force on the blade and the orifice size are both adjustable, but are not varied during cutting. Instead of the above described system in which the feed rate changes during the cut with changing cross section, Demurger adds a substantial force to the saw arm weight by the saw hydraulics and adjusts the orifice to a very small diameter. Variations in the cutting resistance during cutting are made insignificant by comparison to the elevated force. A flow control valve or orifice is adjusted to produce the desired feed rate for the high force, with the goal of the feed system being that the feed rate will be constant without regard to variations in cutting resistance. The possibilities for blade breakage and stalling are substantial in such systems.

Another example of a feed control system in which both the feeding force and the orifice size are adjustable is disclosed in U.S. Pat. No. 4,534,247 to Taguchi. The Taguchi band saw feed control system is intermittently operated to attempt to avoid work-hardening. The intermittent feeding, in effect, applies an impulse to the saw blade to enhance cutting. In the hydraulic feed control system (an analogous electromechanical system is also disclosed) an adjustable reducing valve allows the pressure in the hydraulic cylinder (net force of the arm on the workpiece) to be adjusted, and an adjustable flow control valve downstream of the reducing valve allows an adjustment of the rate of return of fluid to the tank for any given cylinder pressure. During operation these valves are usually adjusted and remain fixed with flow back to the tank being periodically interrupted by a timer operated solenoid valve to enhance saw cutting.

d. Fixed Force, Variable Orifice Systems.

The attempts to date to use sensors and automatic controls to better match saw feed rates to the dynamic saw operating conditions have been based upon feed systems in which the orifice size is varied during cutting.

In the band saw of U.S. Pat. No. 4,432,260 to Sakurai, a conventional hydraulic and/or electric motor-driven feed is employed, and the rate of feeding is varied as the cross section of the workpiece varies. Thus, as the transverse dimension of the workpiece increases, the feed rate decreases. A decrease in the length of engagement of the blade with the workpiece results in an increase in the feed rate. The force down on the workpiece, however, is the same for various feed rates, and the feed control mechanism is a fixed force, variable orifice feed system.

U.S. Pat. No. 4,481,845 also to Sakurai varies the speed at which the blade is advanced, as well as the rate of feeding to attempt to provide constant cutting power throughout the cut. The cutting resistance to the blade is sensed by torque sensing means and used to compare with a theoretical stored value, and the rate at which the blade is fed through the workpiece is varied. The force of the arm and blade on the workpiece, however, remains constant for various feed rates, and the system is a fixed force, variable orifice feed system.

Using a sensed resistance to vary feed rates also is applied in the sawing apparatus of U.S. Pat. No. 3,715,946 to Kaltenback. Kaltenback employs a torque-based feed control for a rotary saw. The hydraulic feed control system is a fixed force, variable orifice system, with the regulating valve controlled by feedback from the saw's motor as to the operating torque.

Another example of control of a band saw's feed rate by a fixed force, variable orifice feed system in order to optimize cutting is illustrated in U.S. Pat. No. 4,437,367 to Hauser. The Hauser saw is computer controlled, and the pressure (either hydraulic or electromechanical) supporting the saw arm is measured and compared against a value stored in the computer. The orifice of the hydraulic system is then opened or closed to match the actual support pressure against a theoretical pressure. The computer has various workpiece cross sections stored therein and generates an output signal, which controls the feed orifice, that maintains the residual tensile stress in the saw blade at about a predetermined constant value. In theory the saw cuts with an actual cutting force that approximates the theoretical, ideal cutting force. Adjustment of the ideal cutting force for dulling of the blade is provided by comparing the time required to make a cut as the blade dulls against a time required when the blade is sharp.

In U.S. Pat. No. 4,557,168 to Takiwa the hydraulic feed control also is a fixed force, variable orifice system in which sensors which detect the resistance to cutting are used to control the saw blade feed rate during the cut.

The us of feedback to control the feed rate of band saws by varying the orifice size during feeding has an inherent problem. Most of the sensor feedback systems (e.g. Hauser Pat. No. 4,437,367) sense a force component on the blade, used the sensed information to vary the orifice and then sense the effect of varying the orifice on the force on the blade. When the orifice is adjusted, the weight of the saw arm is automatically redistributed between the support cylinder and the workpiece. The dynamic shifting between the support cylinder and workpiece can be anticipated, but these feedback systems inherently use an inferential automatic control system with inherent attendant time lag to complete the control loop.

Moreover, any time the orifice of a feed system is controlling the advancement of the saw blade through the workpiece, there is the opportunity, if increased cutting resistance is encountered, to exceed the capacity of the blade or the saw, with resultant blade breakage or saw stalling. By contrast when the force cylinder is controlling, increases in the cutting resistance merely slow the rate of cutting, but cannot increase the force on the blade beyond the maximum established by the force cylinder. Put simply, when orifice-controlled cutting occurs, the machine controls and can overstress the blade, while when force-controlled cutting occurs, the workpiece controls cutting and will merely slow the cut.

e. Adjustable Force, Variable Orifice Systems.

U.S. Pat. No. Re 25,901 to Whitmore discloses a hydraulic feed system in which both the feed force and the control orifice can be adjusted. The operator may select a net downward force applied to the band saw blade by backpressure valve which regulates the amount of the saw arm weight which is supported by the hydraulic support cylinders. A second independently operable orifice can be adjusted to change the rate at which the saw will descend for any force setting. The Whitmore feed system further provides a hydraulic control circuit which will vary the feed rate during cutting by changing the effective orifice opening size as the cross section changes or the hardness of the workpiece changes. Changing the feed rate to match the workpiece has the effect of maintaining the rate at which the material is cut from the workpiece at a constant, but as set forth above, the feed system inherently can over stress the saw blade if the orifice adjustments do not match the cutting resistance properly. This variable orifice-based feed system can force the blade into the workpiece with a force which exceeds the capacity of the blade.

f. Variable Force Systems.

Band saw feed systems in which the force has been varied during cutting have not been employed, whether the system has a fixed or adjustable orifice. Similarly, varying both the force and the orifice size during cutting is not found in the prior art.

There are, however, considerable advantages to be gained from controlling a band saw feed rate by varying the force, as opposed to the orifice size, during cutting. First, the force can be varied but always maintained below the force which would break the blade or stall the machine. Second, when combined with force feedback sensors, a force-based feed control can use force feedback to directly vary the force applied to the blade, rather than use force feedback to vary a feed orifice, which will change the force on the blade. Moreover, these advantages are particularly important when the band saw includes a tilting or impulse cutting enhancement system.

OBJECTS AND SUMMARY OF THE INVENTION

A. Objects of the Invention.

Accordingly, it is an object of the present invention to provide a band saw cutting enhancer and feed system which significantly increases the efficiency of cutting hard metallic workpieces.

Another object of the present invention is to provide a method for feeding a band saw blade through a workpiece which is suitable for use with and augments the cutting efficiency of a band saw having either a tilting-type or impulse-type cutting enhancer.

A further object of the present invention is to provide a band saw feeding apparatus and a method of feeding which responds more quickly to feedback as to dynamic saw operating conditions to allow better control of the saw blade feeding during cutting.

Another object of the present invention is to provide band saw apparatus and method in which the angle of engagement of the workpiece by the cutting edge of the blade or the tilting action of the blade can be varied more efficiently during cutting so as to enhance the efficiency and reduce the time of cutting.

Still a further object of the present invention is to provide a band saw feed system which inherently reduces the likelihood of blade breakage and saw stalling.

Still another object of the present invention is to provide a method for cutting hard, metallic workpieces or the like which reduces the set up time between the cutting of different materials or objects, provides the user with grater flexibility and control during cutting, and allows tailoring of cutting to shape and hardness variations in the workpieces being cut.

Still another object of the present invention is to provide band saw apparatus which is durable, easy to use, and employs standard band saw cutting blades, and can be retrofit to existing band saws.

The band saw apparatus and method of the present invention have other features and advantages which will become apparent from, or are set forth in more detail in, the accompanying drawing and following description of the preferred embodiments.

B. Summary of the Invention.

The band saw apparatus of the present invention includes blade drive assembly formed for support and guided movement of a saw blade for cutting a workpiece and including a movable carriage and a pair of rotatable blade drive wheels. An endless band saw blade is mounted to the drive wheels, and a feed assembly is coupled for advancement of the carriage means toward the workpiece. In one aspect, the improvement in the band saw apparatus of the present invention comprises, briefly, the feed assembly being formed for variable force-feeding of the saw blade during cutting. Additionally, it is preferable, in another aspect of the present invention, to provide a cutting enhancer formed to tilt the saw blade at both blade guides to effect tilting about the transverse center of the workpiece. Moreover, when cutting enhancers are employed, a force-controlled feed system advantageously permits substantially unconstrained movement of the drive carriage toward and away from the workpiece in response to displacement of the saw blade by the cutting enhancer.

Additionally, the sawing apparatus of the present invention preferably includes a controller, most preferably a computer, for varying, over the depth of cut, the force with which the saw blade is fed into the workpiece as a function of feedback and/or pre-programming as to workpiece parameters.

The method of cutting a workpiece of the present invention includes the steps of moving a saw blade across the workpiece to effect cutting, and during cutting, controlling the rate of movement of the carriage and blade by varying the support force controller while maintaining the orifice size as adjusted prior to cutting. Moreover, when a cutting enhancer is employed, the improved method of the present invention includes controlling advancement primarily by the force controller so that the band saw frame or carriage is free to move toward and away from the workpiece as may be required.

DESCRIPTION OF THE DRAWING

FIG. 9 is a side elevational view and schematic diagram corresponding to FIG. 1 of an alternative embodiment of the present invention.

DESCRIPTION OF THE PREFERRED EMBODIMENTS

A. Major Band Saw Components.

Figure 1:
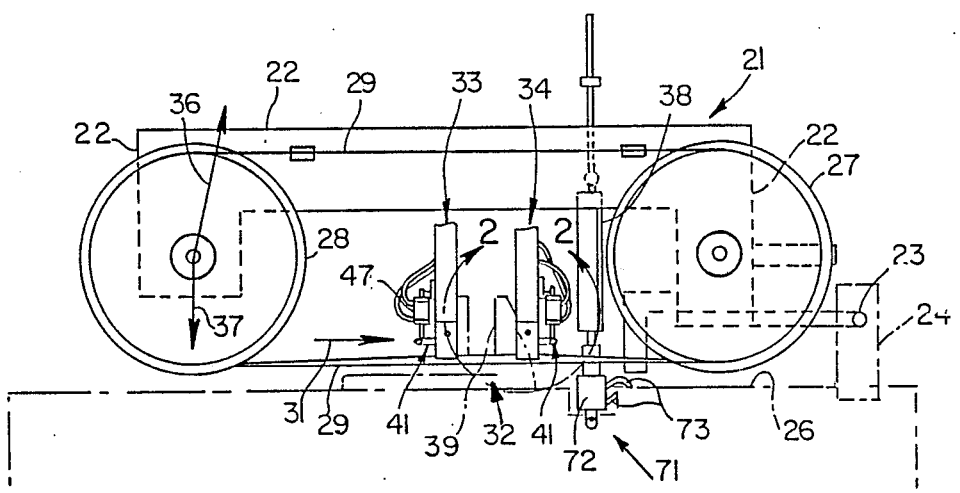
FIG. 1 is a side elevational view of the arm portion of a pivotal arm, horizontal band saw with the wheel housing removed and including the blade displacement apparatus of the present invention.

The method and apparatus of the present invention are suitable for use with a wide variety of horizontal and vertical band saws. For purposes of illustration, FIG. 1 shows a horizontal, pivotal arm, band saw constructed in a manner more fully set forth in my U.S. Pat. No. 3,682,030, but having mounted thereon the band saw blade displacement or cutting enhancer apparatus of the present invention.

Band saw 21 includes a horizontally extending arm 22 which is pivotally mounted at 23 to mounting bracket or flange 24 extending upwardly from base 26 of the saw. Rotatably mounted proximate opposite ends of arm 22 are drive wheel means including a drive wheel 27 and an idler wheel 28, upon which an endless band saw blade 29 is movably mounted. Saw blade 29 advances in the direction of arrow 31 across a cutting stretch 32 between a pair of spaced-apart blade guide assemblies 33 and 34. Arm 22 acts as a movable frame or carriage means which can be advanced toward the workpiece as the saw blade cuts through the workpiece.

As will be understood, however, the present description of a pivotal arm band saw is for the purpose of illustration only, and it shall not limit the applicability of the apparatus and method of the present invention to such pivotal arm saws. The present invention may be easily adapted for use with either horizontal or vertical band saws with frames or carriages which translate instead of pivot. Additionally, it is contemplated that arm 22 could even be stationary, with the workpiece being moved toward arm 22 by, for example vice assembly 39, in which case such vice assembly would be considered as "carriage means" as used herein.

Pivotal arm band saw 21 can be displaced in either of the directions of arrows 36 and 37 by lift cylinder or feed means 38 mounted between base 26 and arm 22. The arm is initially lifted upwardly in the direction of arrow 36 until it is above a workpiece (not shown in FIG. 1 but normally held by vice means 39). Cylinder or feed means 38 then allows the saw arm to pivot about mount 23 downwardly in the direction of arrow 37 as a saw blade is advanced so as to cut the workpiece. In most band saws lift cylinder 38 actually supports arm 22 as, it descends so that the full weight of the arm is not applied as the saw cuts through the workpiece. In some saws, however, cylinder 38 will add to the weight of the arm to produce the desired cutting force and feed rate.

For purposes of simplicity of illustration, the saw of FIG. 1 has the drive wheel housings or covers removed. Additionally, it will be understood that guide assemblies 33 and 34 are carried by arm 22, and the guide assemblies twist blade 29 from its horizontal orientation on the drive and idler wheels to substantially a vertical orientation across cutting stretch 32.

As thus far described, the band saw apparatus is well known in the prior art, and prior art vertical band saws (for example, my U.S. Pat. No. 4,117,756) and prior art horizontal band saws include functionally equivalent structure.

Band saw 21 further includes a cutting enhancer, generally designated 41, formed and mounted to reciprocate and/or tilt blade 29 with respect to the workpiece during cutting of the same. Broadly, cutting enhancer mechanisms also are known in the prior art and are not regarded as a novel portion of the present invention.

B. Feed System-General.

In most band saw apparatus feed cylinder 38 includes a flow control valve means or orifice (not shown in FIG. 1, but shown at 185 in FIG. 9), which enables selective control of the rate at which the working fluid in cylinder 38 (fluid 181 in cylinder 152 in FIG. 9) can escape from the cylinder to thus control the rate at which arm or carriage means 22 descends toward the workpiece.

Without more, a feed system having an adjustable orifice 185 would be a fixed force, adjustable orifice feed control. As will be seen in FIG. 9, however, adjustable orifice 185 is coupled by solenoid 191 to a computer controller 111 through conductors 189. Thus, the band saw feed system of FIG. 9, as thus far described has the capability of operating as a fixed force, variable orifice feed. As is set forth in detail below, however, it is only in rare instances which variation of the orifice 185 occurs during operation of the saw. Under most operating conditions the feed system employed in the saw of the present invention can be characterized as an "adjustable," not "variable" orifice system, i.e., the orifice is adjusted at the start of the cut but is not varied during cutting.

Both band saw 21 of FIG. 1 and band saw 112 of FIG. 9 preferably include cutting enhancer apparatus, respectively designated 41 and 141. As is described in detail hereinafter, such apparatus effects cutting enhancement by tilting the band saw blade or by applying an impulse to the back of the blade. When such an enhancer is operating, it is an important feature of the present invention to operate feed cylinders 38 and 152 in a manner which does not inhibit or impede the effect of operation of enhancers 41 and 141. The feed control system should not interfere with the natural tendency of the saw arms 22 or 113 to rebound or bounce as the blade is tilted or displaced toward the workpiece.

In the band saw of the present invention it has been found that one way to effect controlled feeding without impeding either tilting or impulse cutting enhancement is to force-control the feeding, i.e., to in effect disengage, bypass or open flow control orifice 185 and control saw arm descent by controlling the support force on the saw carriage.

One feed assembly which is suitable to control the support force on the carriage arm is shown in FIG. 9. Cutting force cylinder 151 is mounted between arm 113 and base 115 and includes a fluid circuit 153 which can be adjusted before the start of cutting and varied during cutting to control the support force resisting arm descent and thus the saw feed rate. The details of this system will be described below. Thus, the feed system of the saw of FIG. 9 can be operated as a variable force, variable orifice feed system, although in most instances it will be operated by essentially bypassing or opening the variable orifice and varying the force supporting the movable carriage to control the saw feed rate. The saw feed system as so operated is a variable force, adjustable orifice system.

C. Cutting Enhancer.

In the improved band saw apparatus of the present invention cutting enhancer 41 is provided by two relatively spaced-apart blade support assemblies, each of which is formed and mounted for reciprocation of blade 29 toward and away from the workpiece. If such reciprocation is in unison and in phase, the enhancer will apply an impulse to the back edge of the blade to effect cutting enhancement. If the two guides are simultaneously reciprocated in opposite directions, blade 29 will be tilted to enable variation of the angle of the cutting edge of the blade. Either enhancement technique increases the cutting force per unit area of the localized pressure of the blade against the workpiece, but blade tilting has been found to effect superior cutting enhancement and is preferred.

Figure 2:
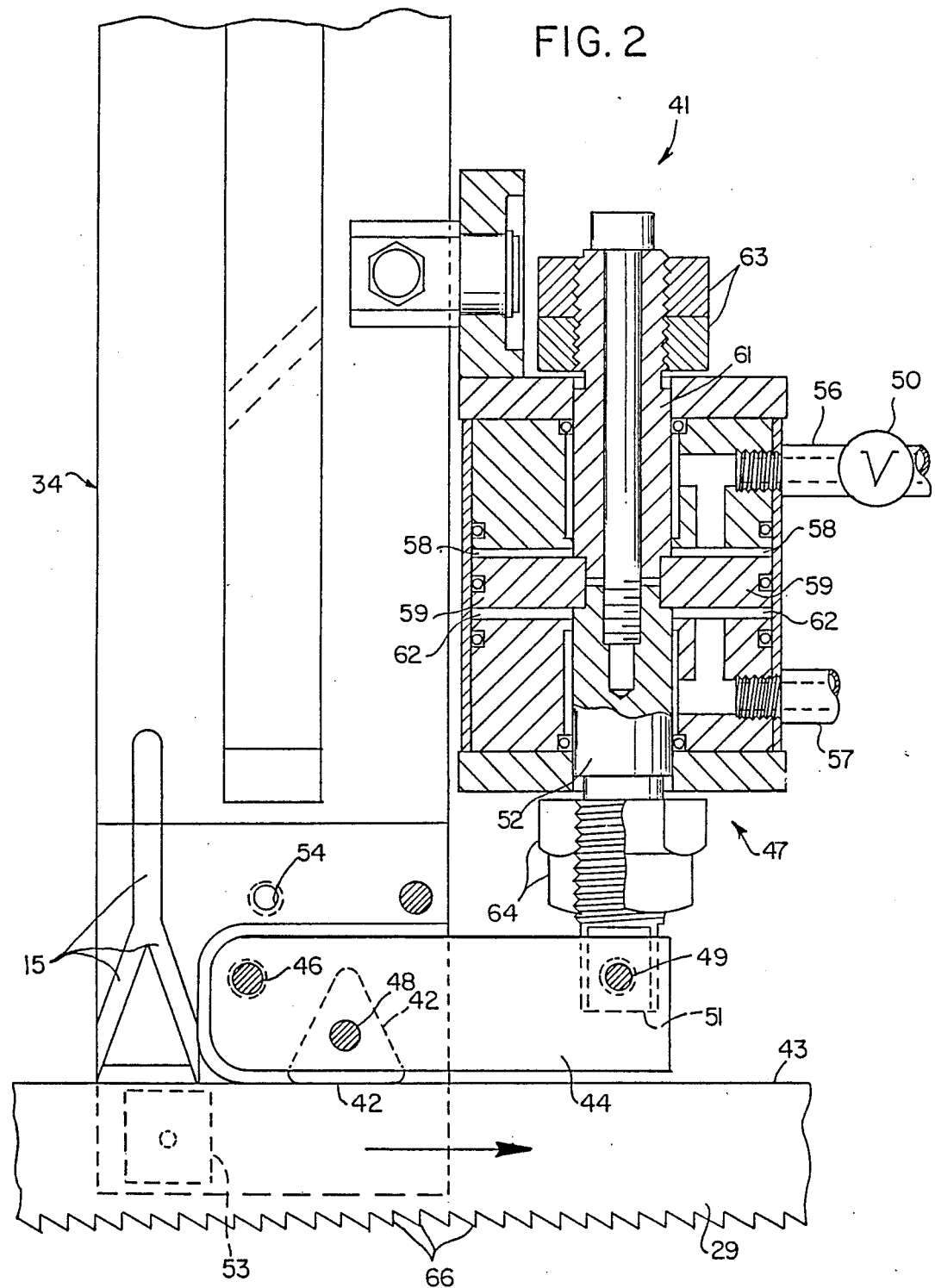
FIG. 2 is an enlarged, fragmentary, cross-sectional view of the area bounded by line 2—2 in FIG. 1 showing blade displacement or cutting enhancer apparatus constructed in accordance with the present invention.

As best may be seen in FIG. 2, cutting enhancer 41 on each blade support assembly preferably includes a blade support or guide block 42 mounted for engagement with the back edge 43 of saw blade 29. Blade support means 42 further includes lever means 44 pivotally mounted at 46 to an end of guide assembly 34. Coupled to an opposite end of lever means 44 is a double-acting spool valve or piston and cylinder, generally designated 47, which may be pneumatically or hydraulically actuated. It is preferable that blade guide block 42 be pivoted to lever 44 at 48, and that lever 44 actually be formed as a pair of lever arms on either side of the central guide block. The pair of arms can be pivoted at 49 to the end 51 of movable piston element 52.

Figure 3:
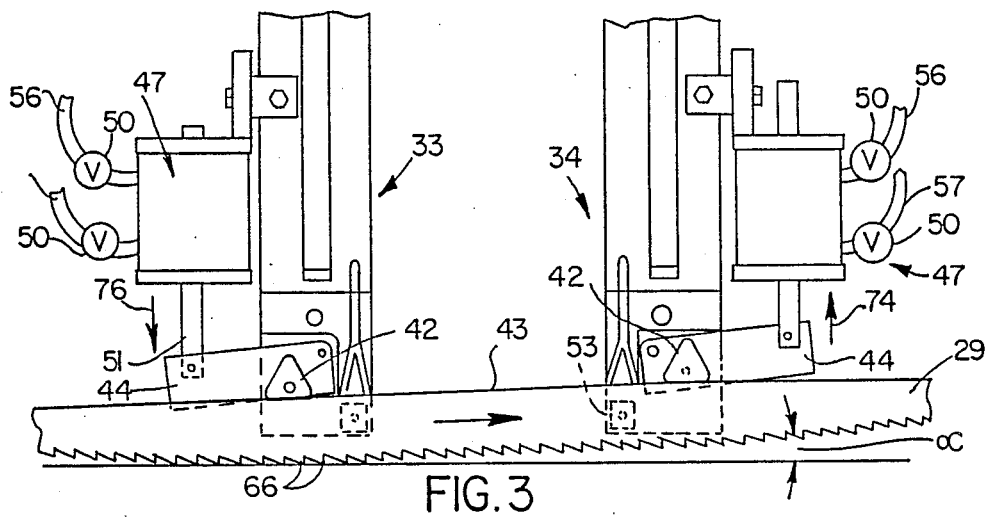
FIGS. 3, 4 and 5 are fragmentary, side elevational views of band saw guide assemblies constructed in accordance with the present invention with the blade displaced upwardly on the righthand side of the displacement apparatus, both guides in a neutral position, and the blade displaced upwardly on the lefthand side of the apparatus, respectively.
Figure 4:
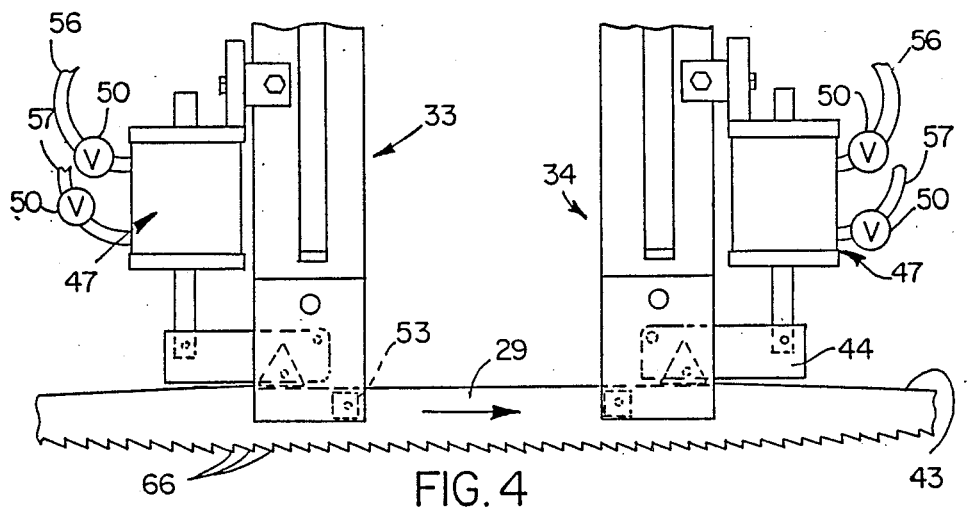
Figure 5:
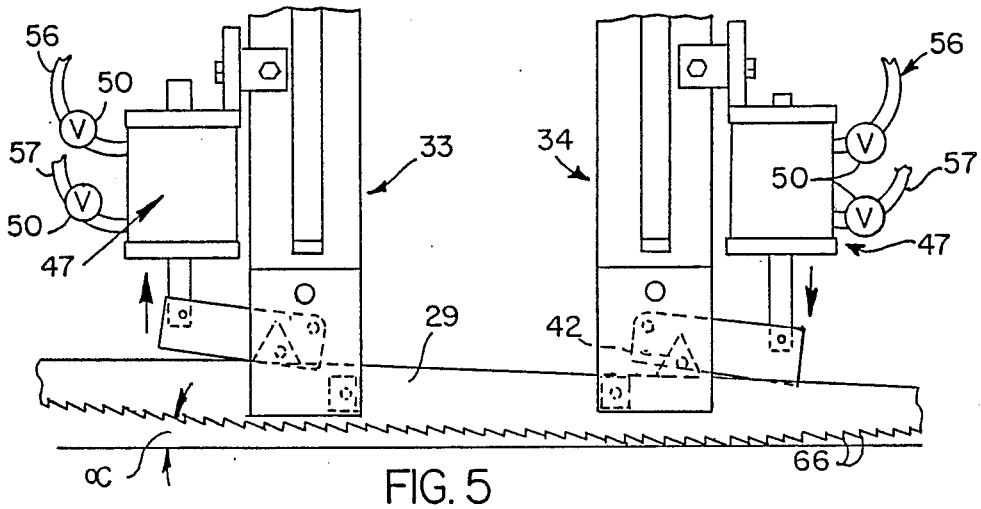

In order to twist the blade into a vertical orientation, it is preferable that guide assemblies further include a pair of guide blocks 53 which engage the sides of blade 29. As shown in FIG. 2, only one block 53 is visible, but it will be understood that a second half of the lower guide assembly carrying a similar block 53 is attached to the end of the guide by a fastener mounted into threaded bore 54. FIG. 3 corresponds to FIG. 2 in that the outside halves of the guide assemblies have been removed, but FIGS. 4 and 5 show the assemblies with the other half of the ends of the guides secured in place s that a carbide guide block 53 engages each side of blade 29, in a manner well known in the art. The guide assemblies also preferably include coolant channels 15 for the discharge of fluid coolant down on the back edge 43 and sides of the blade.

Fluid piston-cylinder assembly 47 is operated by communicating fluid through one of lines 56 and 57, for purposes of illustration through line 56, to cylinder 58. In order to control the flow of fluid to cylinder 58, it is preferable that flow control valve 50 be positioned in one or both of lines 56 and 57. Valve 50 can be formed for controlled flow in one direction and free flow in the opposite direction or for controlled flow in both directions. The flow of fluid into cylinder 58 causes washer or flange 59 mounted on central longitudinally extending shaft 61 to be downwardly displaced, for example, by a distance of 0.180 inches (4.5 millimeters), which in turn causes backup guide 42 to move 0.060 inches (1.5 millimeters). When fluid is supplied in line 57 and allowed to escape through line 56 past valve 50, cylinder 62 receives fluid, and the flange and shaft are upwardly displaced. The rate that the fluid volume enters or leaves cylinder 58 can be controlled by valve 50 so as to control the speed of displacement and the duration of dwells, for example, at maximum displacement.

Lock nuts 63 and 64 can be used to easily vary the amplitude of displacement. It will be seen that displacement need not be very great in order to generate a substantial displacement at cutting edge 66 of the blade. As will be readily understood, the vertical displacement of the end 51 of shaft 61 is transmitted by lever 44 to guide block or blade engaging support 42. This in turn causes displacement of the edge 43 of the blade and a downward displacement and a slight localized increase in pressure of the cutting edge or teeth 66 against the workpiece.

In order to minimize lateral deviation of the saw blade, guides 33 and 34 should be positioned as close to workpiece 81 as possible. Such positioning of the blade guides essentially eliminates (minimizes) the flexure of blade 29 during impulse-type displacement and/or tilting.

Displacement of blade 29 by a pair of spaced-apart blade guiding assemblies has several important advantages over a single point displacement assembly of the type disclosed in U.S. Pat. Nos. 4,546,682 and 4,127,045. First, as will be described in more detail hereinafter, it enables very substantial changes in the angle a which the workpiece is contacted during cutting. Instead of pivoting around arm pivot point 23 or flexing the blade about one side of the workpiece, the two displacement assemblies 41 can be run out of synchronism so as to tilt, rock or see-saw the blade with respect to arm or drive wheel frame 22 through angles which are much greater than can be accomplished by a single point displacement device for the same amplitude of displacement. As the area engaged by the teeth decreases, the ability of the teeth to approach maximum penetration short of digging in is enhanced.

Second, when blade tilting enhancement at both guides is used, displacing blade 29 in opposite directions through an equal stroke will result in tilting of blade 29 about a center of tilting which is a plane located approximately coincident with the transverse center of workpiece. The cutting pattern which results can be seen in FIG. 7. When tilting occurs about the transverse center of the workpiece, the reaction bounce of arm 22 for any angle of tilt will be minimized as compared, for example, to the bounce induced by tilting at one guide only. Since the angle of tilt determines the area change and the increase in pressure of the teeth against the workpiece, less dynamic bouncing occurs for cutting enhancement using two enhancers tilting the blade at both guides with simultaneous and opposed strokes of equal length and the guide assemblies immediately adjacent the workpiece.

Third, each of the reciprocation assemblies 41 can be independently operated. Thus, it is possible to superimpose different displacement frequencies and amplitudes on top of each other, as well as operating the displacement assemblies in synchronism. This allows the user to tune or adjust displacement patterns until the optimum for a particular workpiece and saw arm inertia is achieved.

Additionally, as compared to specially formed blades of the type disclosed in U.S. Pat. Nos. 4,423,653 and 4,195,543, variation in the area being cut by cutting edge 66 can be accomplished using enhancers 41 at a frequency which is totally independent of the shape or configuration of blade 29. Moreover, the amplitude and rate or speed of displacement is also totally independent of the shape or configuration of blade 29. Still further, it is possible to vary the length of time or duration at which the blade dwells at any of various cutting angles with respect to the workpiece. The band saw blade can be any standard or conventional blade, and the ability to vary frequency, amplitude, speed of displacement and duration minimizes blade wear since the cutting force and large chip load will be more evenly distributed over the length of the blade.

Pneumatic and hydraulic valves 50 and controllers are known in the art which are capable of attachment to fluid piston-cylinder assembly 47 to produce and vary the frequency of fluid pulses to either side of the spool or flange 59. In the preferred form, such controllers can be computer assisted with sensing or measurement apparatus (shown in FIG. 9). FIG. 9 shows a hinge-top or pivotal arm saw with an angular transducer 136, but in a vertical or horizontal saw, a linear transducer would be employed. The main requirement is to measure or sense the position of the saw blade into the material and then controller 111 would set the cutting rate enhancer for optimization of frequency, duration and blade speed, all of which can be independently altered. In the apparatus shown in the drawing, amplitude is controlled by the lock nuts 63 and 64, which can be manually altered, but it will be understood that more elaborate apparatus for automatic, controlled variation of enhancer displacement amplitude also can be incorporated into the fluid piston-cylinder assembly 47.

In the preferred form of the invention the mechanical reciprocation of band saw blade 29 is accomplished by blade support means mounted to a pair of blade guide assemblies of the band saw. Reciprocation of blade support means also can be accomplished, however, by displacing the entire arm 22 toward and away from the workpiece, either alone or in combination with reciprocation at the guide assemblies. Thus, arm displacement means, generally designated 71, may be coupled to arm 22 for reciprocation of the arm toward and away from the workpiece to enable what is primarily an impulse-type displacement of the cutting edge of the blade during advancement across the workpiece. In the preferred form of this embodiment, a fluid piston-cylinder assembly 72 can be mounted in series with lift cylinder 38. Fluid piston-cylinder 72 can be constructed substantially as shown in connection with piston-cylinder assembly 47 and coupled by conduit means 73 to a controller. This approach, however, requires displacement of the entire carriage with its associated high inertia, which is less desirable than displacement of the low inertia blade guides.

D. Cutting Enhancement Method.

The improved cutting enhancement method of the present invention and the variations in cutting force per unit area which can be achieved through the method and apparatus of the present invention are best described in detail by reference to FIGS. 3 through 5. One of the advantages of displacing or reciprocating blade support members 42 for the saw blade is that two spaced apart blade support members on the spaced-apart guide assemblies 33 and 34 can be used to tilt, see-saw or oscillate the blade, as well as to vertically reciprocate or apply an impulse to the blade.

Tilting of the blade can be accomplished by operating the two stroke cylinders 47 out of phase. Thus, as shown in FIG. 3, the righthand lift cylinder and lever 44 are in an up position, as shown by arrow 74, while the lefthand piston cylinder assembly 47 is in the down position, as shown by arrow 76. The downward displacement of the left side and upward displacement of the right side causes the blade to lift upwardly by an angle $\alpha$.

In FIG. 4, both stroke cylinders 47 are in a neutral position, i.e., an intermediate position between the orientation of FIGS. 3 and 5. FIG. 4 also is illustrative of a mid-stroke position when the two stroke cylinders are reciprocated in synchronism and in phase. Finally, in FIG. 5, the positions of the cylinders of FIG. 3 has been reversed with the result that the angle $\alpha$ is now produced as an opposite or mirror image of that produced in FIG. 3. As will be seen from FIGS. 3–5, therefore, cutting stretch 32 of blade 29 tilts with respect to arm or drive wheel frame 22 about a center of tilting located between blade support assemblies 33 and 34. Moreover, in FIG. 7, such blade tilting preferably occurs proximate the center of the transverse width dimension of workpiece 81. Such tilting of blade 29 about the center plane of workpiece 8 minimizes the reaction displacement or bouncing of arm 22 for a given angular displacement of the blade.

As will be understood, operation of cylinders 47 can be synchronized out of phase so as to produce a constant oscillation or tilting of blade 29. In the preferred method of operation the blade is tilted about once every 3 to 5 seconds, with the time required to move from one extreme angle to the other being about ½ second.

In addition to oscillating the blade, various complex reciprocation modes can be employed. It is possible, for example, to operate one of stroke cylinders 47 at twice the frequency of the other so that there are various in-phase and out-of-phase displacements. It is also possible to hold one of the cylinders in a neutral position while the other is displaced down and then up, and thereafter to hold the reciprocating one and displace the first one which was held through a stroke. To enhance control the apparatus is shown with flow control valves 50 in both lines 56 and 57.

Thus, it is a very important feature of the present invention that the mechanical reciprocation of the band saw blade can be accomplished at at least two distinct, spaced-apart locations along the length of the blade so as to enable oscillation, reciprocation and combinations thereof. Using a computer to run the pneumatic controller, it is readily possible to program very complex blade reciprocation and tilting patterns so as to produce optimum cutting efficiency.

Figure 6:
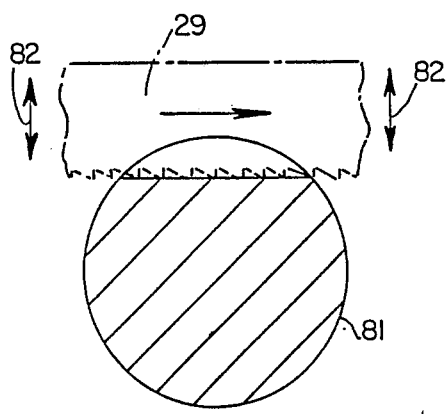
FIG. 6, 7 and 8 are enlarged, cross-sectional views through a workpiece illustrating the method of cutting a round workpiece of the present invention.
Figure 7:
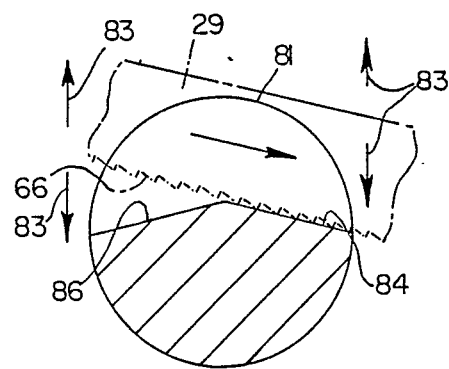
Figure 8:
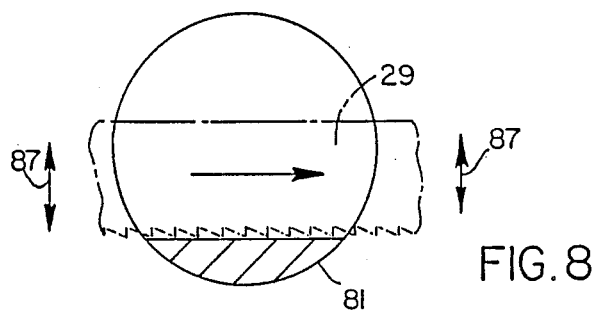

An illustration of the method of the present invention and the advantages of the apparatus of the present invention can best be understood by reference to FIGS. 6, 7 and 8. As will be seen, a piece of round stock or workpiece 81 of varying width is being cut by blade 29 using the apparatus of the present invention. In order to enhance the efficiency over the depth of cut, it is preferable to change the blade displacement mode as a function of the width being cut. In FIG. 6, blade 29 is generally horizontally oriented, and the stroke cylinders are being operated in synchronism for essentially vertical displacement, i.e., impulse cutting enhancement, as indicated by arrows 82. Such vertical reciprocation is continued until blade 29 has cut through approximately 10 to 20%, and preferably 15%, of the diameter of workpiece 81. Thus, when the width and area of the workpiece are relatively small, see-sawing action is not required. Once the saw has cut through about 15% of the diameter, the stroke cylinders 47 are operated so as to cause tilting or oscillation of blade 29, as indicated by arrows 83.

This oscillation of the cutting stretch about the workpiece results in a cut in which there are two beveled surfaces 84 and 86 meeting proximate the transverse center of the workpiece against which the cutting edge 66 is alternately cutting. The angles of these surfaces are exaggerated in FIG. 7 for the purpose of illustration, and they would normally be equal to the angle $\alpha$ from the horizontal count as shown in FIGS. 3 and 5 or $2\alpha$, between cutting edge 66 and surface 86. The cutting is continued in a tilting or oscillation mode until approximately 80 to 90% of the diameter has been cut, at which point the area of the workpiece is again small and the cylinders are operated in synchronism again, as shown in FIG. 8 and indicated by arrows 87.

Alternatively, the saw may be operated without any cutting enhancement during the first and last 5 to 10% of cutting of the round workpiece.

As will be seen from FIG. 7, the advantage of tilting or oscillating is to reduce the length of surface being cut at any one time during oscillation. When round stock is being cut, the effective cross section width can be reduced by oscillation in the center of the cut. The outside edges of round stock tend to have a lesser cross section in any event and oscillation is not required For square bar stock, it is advantageous to start the cut without oscillating until the cut is established then oscillate the blade through the substantially entire cut as a way of reducing the length of the blade in contact with the workpiece during the cut. The cut is completed without blade displacement (oscillation or reciprocation) to avoid a sudden break through of the thin section, digging in of the teeth, and stalling of the saw (the last 5 percent or less).

Most preferably when tilting-type cutting enhancement is used to cut workpieces having horizontal lower surfaces, enhancer operation (tilting) is terminated, but not saw blade advancement, with the saw blade oriented at a tilt with respect to horizontal. FIGS. 3 and 5, therefore, show the positions of blade 29 which will produce the cleanest exit cut. It is further preferred to exit workpieces, and particularly workpieces square and rectangular stock, with the blade tilted up in the direction of blade advancement, as shown in FIG. 3. This orientation is the most effective in preventing premature blade breakthrough.

It also should be noted that the cutting enhancer apparatus of the present invention can be used with conventional blades by employing powered blade displacement or with variable height blades and employing unpowered displacement.

E. Bypassing Feed Orifice During Enhancer Operation.

In order to prevent digging in of the blade, while still maintaining substantial vertical displacement the fluid control valve in fluid feed cylinder 38 preferably is opened to provide little resistance to fluid flow or is completely disengaged. In the saw of FIG. 1 the fluid in cylinder 38 is dumped to the tank, while in the saw of FIG. 9, the feed orifice or valve 185 is bypassed or opened up, as is explained in more detail in connection with FIG. 9. The orifice controlling rebound and descent of the arm is essentially enlarged to the size of the system conduits, and feeding is controlled solely by gravity (in vertically movable saws) and the nominal resistance to fluid flow inherent in the cylinder hydraulic o pneumatic system. Such a feed system, without more, is a fixed force (saw arm weight), fixed orifice (conduit size) feed control.

The result of freeing arm 22 from the constraint of feed cylinder 38 is believed to be that displacement of the blade by assemblies 41 urges the teeth into the workpiece beyond the initial set required to pull a chip and until the teeth start to dig in and stall the saw. As the teeth start to dig in, the resistance increased rapidly and forces arm 22 upwardly, even though displacement assemblies 41 are urging the blade downwardly. The downward displacement of assemblies 41 essentially causes the teeth to penetrate the workpiece until the point of digging in is about to occur, at which point further downward displacement is converted to upward displacement of arm 22 against gravity. Disconnecting feed cylinder 38 effectively permits the arm to automatically move away from the workpiece or rebound just before digging in when the substantial increase in load occurs.

Moreover, freeing the arm to move without the constraint of the feed cylinder and associated control circuit allows the arm to rapidly move back toward the workpiece to maintain the cutting force on the workpiece when the saw blade is displaced away from the workpiece. Thus, the cutting force is maintained at a substantially constant level (the saw arm weight) throughout a longer portion of the reciprocation or blade displacement cycle. The result is maintenance of the cutting force at a more constant level closer to, but below, the level producing digging in and stalling of the saw for substantially the entire displacement cycle. This force-based feed system substantially enhances cutting efficiency as compared to orifice-based systems which impede rebound and can slow descent after rebound.

As will be apparent, the weight or inertia of the arm affects rebound, as will the area of the workpiece being engaged and the hardness of the workpiece. The area of the workpiece being engaged will also be effected by the amount of see-sawing (reduction of area) which is occurring and the width dimension of the workpiece. The weight or inertia of some commercially available band saw arms (movable frame or carriage) will not be so great as to prevent movement of the arm away from the workpiece before digging in of the teeth. For those in which the weight is too great and in applications in which the force is to be adjusted or varied, a force-control cylinder 151 as shown in FIG. 9 can be added to saw 21.

Accordingly, for a given arm inertia or force, support-cylinder, adjusted inertia and given spaced-apart displacement assemblies, the operator can tune the enhancer amplitude, frequency, displacement speed and duration of any dwells in the displacement of the saw blade to cause the teeth to penetrate the material up to a maximum short of digging in, or for very hard materials up to a maximum for the inertia of the arm. The latter condition occurs when the arm is very light or has a low inertia and it is not possible to penetrate the teeth into the workpiece to a degree approaching the dig in (stall or shear) point. Most commercially available saws will have sufficient inertia to cause the saw teeth to at least approach the dig in point and back the arm up to release the blade short of dig in once the amplitude, frequency and speed of displacement have been tuned to the saw's physical characteristics.

In the preferred form pivot 23 provides means coupling arm or frame 22 to the remainder of the saw for advancement of the saw blade through the workpiece (or through the portion of the workpiece being cut·if the piece is not to be cut completely through). When cylinder 38 is disengaged, pivot means 23 for coupling the blade for advancement is also coupled for free or substantially unconstrained movement (pivoting) toward or away from the workpiece in response to relative displacement of the saw blade away from and toward the workpiece. This enables guide assemblies 33 and 34 to be positioned as closely proximate opposite sides of the workpiece as can be accomplished while still cutting to the desired depth in the workpiece When cutting enhancer cylinder 71 is employed, disengaging cylinder 38 or bypassing the flow control orifice still frees arm 22 to rebound or move toward and away from the workpiece as necessary to avoid dig in of the teeth. Alternatively, displacement means 71 can be provided with means, such as a relief valve (not shown), for releasing or terminating downward pressure in the event that resistance from digging in of the teeth starts to increase dramatically, or a balance or forcecontrol cylinder can be coupled to arm 22 in parallel to cylinder 38, as shown in FIG. 9, and cylinder 38 bypassed.

F. Computer Controlled Band Saw.

An alternative embodiment of the band saw of the present invention illustrating a force-based feed system is shown in FIG. 9. Saw 112 is coupled to computer 111, which is preferably a general purpose digital computer, to permit variation and optimum control of operating parameters of the saw. As shown for the saw apparatus of FIG. 1, saw 112 includes arm 113 pivotally mounted at 114 to saw base 115, and particularly arm support flange or structure 116. Carried by arm 113 are a pair of wheels 117 and 118 upon which saw blade 119 is mounted, and the pivotally mounted arm thereby provides a movable carriage means which can be displaced toward or away from workpiece 123 by fluid piston-cylinder assemblies 151 and 152.

1. Guide Assemblies.

In order to guide saw blade 119 as it cuts workpiece 123, the saw further includes a pair of laterally movable guide assemblies 121 and 122 which are mounted to arm 113 by a track or guideway 133. Although it is possible to provide one of guide assemblies 121 and 122 as a fixed assembly, it is most preferable that both assemblies are mounted for displacement along guideway 133, as indicated by arrows 126.

The importance of maintaining the saw blade guide assemblies as close to workpiece 123 as possible in order to avoid lateral blade wandering also is well known. In order to enhance the accuracy of band saw cutting, saw 112 is provided with guide assembly displacement means 127 for displacing one or both of guides 121 and 122 relative to workpiece 123, which is held by vise 124. In the preferred form guide displacement means 127 include motors 128 coupled to drive lead screws 129 which pass through a threaded bore in members 131. The threaded members 131 are movably mounted with respect to guideway 133 and are coupled to guide arms 132. When actuated and controlled by computer 111, motors 128 can be used to position the guide assemblies in substantially abutting relation to workpiece 123.

Since workpiece 123 can vary in its width dimension over the depth of cut, guides 121 and 122 can also vary in the width of their spacing over the depth of the cut to better conform to the width of the workpiece and thereby improve cutting accuracy. Computer 111 can be fed a signal from sensing means so as to know the position of blade 119 relative to material 123, and in that way the position of guide assemblies 121 and 122 can be laterally adjusted by computer commands to motors 128 for displacement of guide arms 132.

As shown in FIG. 9, input signals from an angle sensing transducer 136 are fed back to computer 111 by conductors 137. For vertical or horizontal saws a linear sensor or transducer would be substituted for transducer 136. As arm 113 pivots, computer receives input as to the depth of the blade in the cut. If the operator inputs the characteristics of the workpiece, for example, cylindrical bar stock, for example, computer 111 can drive motors 128 through conductors 134 to position the guides next to workpiece 123 over the full depth of cut. Alternatively or additionally, a cam and follower assembly (not shown) can be positioned at pivot 114, with the cam having a surface which is angularly correlated to the width dimension at various depths of cut for the workpiece.

It is most preferable that guide assembly ends be relieved at 138 or relatively small in height dimension to facilitate closer positioning of the guide assemblies to workpiece 123 in the undercut areas, such as the lower half of the cylinder.

As will be apparent the advantages of increased accuracy are achieved by adjustment of the guide settings as a function of workpiece width for saws which do not include blade displacement means 141, but in combination with the blade displacement means 141 both improved cutting rates and improved cutting accuracy can be achieved by moving guide assemblies 124 and 122 during cutting to maintain them as closely adjacent to workpiece 123 as possible throughout the cut.

2. Enhancer Assembly.

As shown in FIG. 9, blade displacement means or enhancers 141 are provided by piston-cylinder assemblies 142 to a fluid controller, in this case pneumatic controller 145, which is connected by conduit 140 to pressure source 157. Blade displacement is accomplished by levers 144 upon which guide blocks 146 are mounted and formed to engage the back edge of blade 119, as described in detail in connection with FIG. 2.

In order to enable variation of the displacement of blade 119 by enhancers 141 in combination with variation of other saw operating conditions, pneumatic controller 145 is coupled for control by conductors 150 to computer 111.

3. Feed Control Apparatus.

The feed control means of saw 112 is provided by a pair of fluid piston-cylinder assemblies 151 and 152, which are coupled to fluid control circuits 153 and 154, respectively. The piston-cylinder assemblies are pinned to arm 113 by pins 155 and to base 115 by pins 160 so that forces can be applied between the base and arm to lift the arm and control its descent toward the workpiece.

a. Force Control Circuit.

Piston and cylinder assembly 151 and control circuit 153 are used to lift the saw arm and to control the net cutting force of arm 113, and thus blade 119, on workpiece 123. Piston-cylinder assembly 151 is coupled between saw support or base 115 and arm 113, and assembly 151 either supports the arm with respect to the base (for most saws) or pulls the arm toward the base (for saws having lightweight arms) to achieve the desired ne cutting force.

The pneumatic control circuit 153 preferably includes a branch in which conduit 161, from pressure source 157, has mounted therein a three-way lift valve 159 and a two-way check valve 162. Upon opening of valve 19 by solenoid 163 (upon a command from computer 111 through conductors 164), the high pressure in conduit 161 drives the ball 164 in valve 162 to the right seat and closes conduit 166 for the pressurization of conduit 167, conduit 168 and piston-cylinder assembly 151. High pressure in piston-cylinder 151 raises arm 113 until the arm is stopped by adjustable stop means 169. Note that stop means 169 is mounted on a rod 170 behind the piston rod 175 of piston-cylinder 152. As will be appreciated, limit switches (not shown) and/or transducer 136 can be used to signal the computer to stop lifting arm 113.

When the valve 159 is shifted to a closed position by solenoid 163, the pressure source 157 is blocked, and that allows the pressure in lines 167 and 168 to flow back and leak to atmosphere out of release or bleed orifice 171 in valve 159. Mounted in conduit 166 is a relieving regulator 158 which can be set to relieve pressure in conduit 166 by a valve-actuator 172 coupled by electrical conductors 173 to computer 111. When the pressure drops in 167 and 168 below the pressure set in line 166 set by regulator 158, then ball 164 in check valve 162 moves to the opposite side of the valve, and relieving regulator 158 controls the pneumatic circuit.

In the example shown in FIG. 9, the weight of the arm is greater than the downward force desired to be applied to blade 119. Control circuit 153, and particularly relieving regulator 158, is set so that the net of the pressure in line 166 and the weight of the arm equals the downward cutting force to be applied to workpiece 123 through blade 119. Without more, arm 113 will descend slightly until relieving regulator 158 has discharged gas through outlet 174 and the weight of arm 113 is supported by the combination of the pressure in conduit 166 as determined by regulator 158 and the force of workpiece 123 against blade 119.

In order to enhance the accuracy of adjustment and sensitivity of relieving regulator 158, it is preferable to form control circuit 153 with a conduit 176 having orifice means 177 mounted therein with conduit 176 being coupled to pressure source 157 and conduit 167. Orifice means 177 is a very small diameter orifice, e.g., 0.004 inches, in order to constantly leak pressure into conduit 167 which will be "seen" by relieving regulator 158 when check valve ball 164 moves to the left and opens conduit 166. It is well known in the pneumatic art that the leak provided by orifice 177 into the relieving regulator will cause constant functioning of the regulator and thereby prevent sticking or delays and inconsistency in the pressure relieving function. This portion of circuit 153 is not regarded as containing any novelty.

As will be seen, therefore, cylinder 151 and control circuit 153 provide apparatus which can be used to adjust or, through the use of computer 111, vary, the net force of the saw arm toward the workpiece. This structure permits adjustable force and/or variable force feeding of the saw blade in a manner described further below.

b. Orifice Control Circuit.

While piston-cylinder assembly 151 and force control circuit 153 provide control of the downward cutting force applied by blade 119, piston-cylinder assembly 152 and control circuit 154 provide for control of the feed rate and advancement of the arm and blade down through the workpiece by controlling the size of an orifice through which a working fluid must flow. Force control circuit 153 and orifice control circuit 154, however, are not independent of each other. The rate of flow of the working fluid in circuit 154 will depend upon the net force of the arm on cylinder 152, as established by support cylinder 151.

As will be seen from FIG. 9, it is preferable that fluid circuit 154 be provided as a liquid control circuit, most preferably employing oil 181 as the working fluid. Fluid reservoir 182 is connected by conduit 183 to four valves 184, 185, 186 and 187 and in turn is connected through conduit 188 to piston-cylinder assembly 152. Since circuit 154 is a closed circuit, when piston-cylinder assembly 151 is used to lift or raise arm 113, and if valve 184 is open, fluid is drawn from reservoir 182 through valve 184 and past check valve 186 and into cylinder 151 by suction. Computer 111 is coupled by conductors 189 to valve actuator 191 for control of variable or adjustable valve 185 and by conductors 175 to control valve actuator 180 for variation of the flow through valve 184. As the arm descends, check valve 186 shuts, and the working fluid returns to reservoir 182 through valve 185, which has been adjusted by the computer to control the return of fluid to the reservoir at a predetermined rate.

The rate of return of fluid also will be determined by the weight or net force of arm 113 toward the workpiece, as established by force control cylinder 151 and circuit 153. The computer also can shut off the flow of fluid through valve 185 to thereby stop the descent of the saw arm.

While fluid circuit 153 limits the weight or force which can be applied to the blade, circuit 154 controls orifice size, and together the two determine the rate of descent of the arm and blade. As set forth below, sometimes orifice 185 dominates the rate of descent and sometimes support cylinder 151 dominates.

In order to enhance lifting of the arm and insure flow of liquid 181 to piston-cylinder assembly 152, it is further preferable to provide reservoir 182 as a pressure vessel and couple pneumatic conduit 168 to reservoir 182. During the lifting of arm 113 by pressurization of conduit 167, pressure through conduit 168 on reservoir 182 forces oil up into the cylinder of assembly 152. This pressurized flow of oil to assembly 152 adds to the lifting force o the arm and more positively insures that oil will fill the cylinder than is the case when suction is the only mechanism employed.

G. Force Feeding Compared To Orifice Feeding.

While force control circuit 153 and orifice control circuit 154 do affect each other (cylinders 151 and 152 are essentially in series), for the purposes of analysis one can compare operation of a feed system having only force control to a feed system having only orifice control.

For orifice-controlled cutting-, orifice 185 is adjusted to produce flow of fluid 181 through the orifice so that the blade will cut at a rate close to the maximum rated capacity of the blade. Assuming a constant cross section, the descent rate of the arm will remain constant.

Impurities and discontinuities in bar stock are not uncommon, and uneven blade wear may be encountered even more frequently. If a hard spot in the workpiece or a missing tooth or teeth in the blade are encountered, there will be a fall in the pressure in cylinder 152. When a hard spot or dull section of the blade is encountered, more of the weight of the arm is supported by workpiece 123 and less by cylinder 152. The cutting time of the workpiece will be increased a a result of slowing of the arm for the hard spot or dull blade. The primary problem, however, is not the slowing of the cutting time, but the increase of the force on the blade. The blade is being operated close to its maximum rate of cutting steel when the hard spot or dull section is encountered. The hard spot or dull blade increased the force on the blade, which now comes dangerously close to breaking the blade. If the saw also was operating close to its maximum power capacity, this force increase on the blade also could stall the saw.

If the orifice controlled saw encounters a soft spot, the pressure in cylinder 152 will increase, indicating that cylinder 152 is now supporting more of the arm's weight and workpiece 123 is supporting less weight. The greater pressure on working fluid 181 in cylinder 152 will cause the saw arm to descend faster while passing through the soft spot, but the force on the blade is reduced so that blade breakage and machine stalling are not a concern:

In an orifice based feed control system, therefore, there is a continuous dynamic balancing of the saw arm weight between feed cylinder 152 and workpiece 123. This variation can cause overloading of the blade, with disastrous effect. Moreover, the dynamic shifting of weight inherently makes automatic control of the cutting force by controlling orifice size difficult, even with the use of a computer.

When the same stock is cut using force cylinder 151 to control arm descent, the potential for blade breakage and machine stalling as a result of hard spots or dull blade sections are essentially eliminated.

Force control cylinder 151 provides a constant support force which establishes a net weight of arm 113 that is applied to saw blade 119. Orifice 185 is bypassed by opening valve 192 or opened to wide open so that cylinder 152 essentially is not affecting the feed rate.

If a hard spot or a dull blade section is encountered during force-based feeding, however, cylinder 151 continues to support the said amount of the saw arm weight. There is no flow of working fluid 181 through a control orifice, relieving regulator 158 always maintains the same pre-set pressure in fluid circuit 153. The presence of a hard spot cannot result in an increase in the force of arm 113 on the blade because cylinder 151 establishes a constant arm support force. The hard spot will slow the cut or arm descent rate, but it will not increase the force on the blade. The hard spot may even stop the arm descent completely, but there still will be only the net force on the blade established by cylinder 151.

If a soft spot in the workpiece is encountered during force-based feeding, the net force on the blade will not increase, although the arm descent rate will increase during the soft spot.

When force-based feeding is employed, therefore, the support force can be set at a level very close to that which will produce the maximum volume removal for the particular blade and material being cut without worrying about breaking the blade. The rate at which the blade descends will be controlled solely by the homogeneity of the workpiece and blade sharpness, but the blade force will not exceed the set maximum. There essentially is no shifting of support between the workpiece and the feed cylinder, as occurs when orifice-based feeding is employed.

Changes in cross section also affect orifice-based and force-based feeding. For force-based feeding, an increase or decrease in the workpiece cross section (length of the stretch engaging the workpiece) will not change the total force applied by the blade to the workpiece. Thus if the cross section being cut doubles, the total force will remain the same and the force per unit area of the teeth on the workpiece will be divided by two. As a result, the arm descent and cutting rate will slow, but the blade will not be in danger of breaking. Moreover, as the length of the cut increases, the temperature rise from pulling the chip over the length of the cut increases. Accordingly, a drop in the force per unit area of the teeth on the workpiece during force-based feeding reduces the temperature rise and the chance of chip welding.

Decreases in cross section will produce the opposite effect. The section can become so small that hooking of the blade teeth occurs. Additionally, as the force per unit area of the workpiece increases, the teeth pull larger and larger chips. There is, however, a limit on how large a chip can be pulled without filling the gullets of the blade and causing chip welding. As long as there is no hooking or chip welding, however, reduction of the cross section during force-based feeding still does not cause the force on the blade to increase beyond the level established by cylinder 151.

When orifice-based feeding is employed, a doubling of the cross section of the workpiece will increase the total force supported by the blade. The force per unit area of the teeth on the workpiece does not change dramatically because the area has increased, but the total force on blade 119 rises. While this force is now distributed over a longer section of the cutting stretch, there is considerable danger of exceeding the blade capacity. Additionally, the temperature rise during pulling of the large chip is exacerbated by the high force per unit area. Chip welding becomes even more likely.

Orifice-based feeding allows more and more of the saw arm's weight to be brought to bear on the blade as the cross section increases until the descent rate reaches the pre-set rate. The descent rate will automatically try to remain constant in larger cross sections at the expense of increased force on the blade.

When the workpiece cross section rapidly decreases, cylinder 152 will control and support more of the weight of arm 113. The descent rate will increase as the pressure rises in cylinder 152 until it reaches a maximum descent (free fall descent rate), and the force on blade 119 will fall.

The interaction between the two feed control cylinders 151 and 152, however, can and has been used in the prior art. Thus, in adjustable force, adjustable orifice systems and adjustable force, variable orifice systems, it is common to adjust the orifice to control or limit the descent rate of the saw so that there is no hooking or chip welding in thin cross sections. The force circuit 153 is adjusted so that there is sufficient force on the blade in thick sections to cut, at a rate close to the blade's or saw's capacity.

When such saws are used to cut workpieces of varying area, the orifice will limit the cutting rate in thin sections (orifice control), and the cutting resistance will limit the descent rate in thick sections.

Such feed controlled saws will move at a high rate in the thin sections, but the orifice will prevent saw run away. The net force will act with the orifice size to establish a cutting rate for thin sections, but the orifice size will control arm descent. As the cross section of the workpiece increases, the saw descent will slow. The orifice will have less and less influence on the descent rate as the net weight of the saw arm is shifted to the workpiece until substantially the entire net weight is supported by the cutting resistance of the workpiece. Since the net weight is established by cylinder 151 and force circuit 153, the system is force-controlled in thick workpiece cross sections.

The shifting between orifice and force control will occur automatically in workpieces of varying cross section and computer 111 is not required for variation of either the force or the orifice control circuit to effect this shift. It is possible, however, and prior art band saws have operated by varying the orifice size during cutting in response to sensors sensing operating conditions of the saw to try to maintain the saw operating in the orifice-controlled domain. The method and apparatus of the present invention seek just the opposite, namely, to maintain the saw operating primarily in the force-controlled domain.

H. Force-Controlled Feeding.

As is true of prior art band saws, it is preferably that the saw of the present invention be set up or adjusted initially so that orifice circuit 154 will control descent of the arm in thin workpiece cross sections and force circuit 153 will control descent of the arm in thick workpiece cross sections. Thus, the saw operator will set relieving regulator 158 to establish a support force that will produce cutting of the workpiece proximate but below the theoretical capacity of the blade. This can be imperically determined by timing cuts or by decreasing the support force and listening for blade squeal. When computer controlled, the saw can be input with data sufficient to calculate the proper support force.

Once the force in thick cross sections is set, the arm descent rate in thin sections (or under free fall conditions) can be set by adjusting orifice 185. Again this setting can be imperically tested against the thinnest section which would be encountered or calculated on the basis of input to computer 111. Since blade hooking is difficult to calculate, some imperical testing is usually conducted and can be stored in computer memory.

As so adjusted, saw 112 will descend at a relatively high rate until it enters the workpiece. The saw will be orifice controlled. As the workpiece cross section increases the arm descent will slow, more and more of the net force of the arm will be supported by the workpiece and less and less force will be supported by orifice cylinder 152. Finally, arm descent will be controlled substantially entirely by the cutting resistance of the workpiece, but the maximum force which can be applied to the blade will be limited by force cylinder 151.

The apparatus and method of the present invention maintain such force-controlled saw feeding in most operating situations.

1. During Enhancer Operation.

As above set forth, it is an important feature of the present invention to be able to substantially disengage or essentially uncouple the feed portion of the saw when blade 119 is being displaced or reciprocated by displacement means 141. Such disengagement frees the arm to rebound toward and away from the workpiece as needed to enable a high, substantially constant, cutting force, as determined by cylinder 151 and circuit 153, to be maintained throughout the cutting cycle. In the fluid control circuit 154 of FIG. 9 this is accomplished by providing valve 87 which will dump fluid 181 to reservoir 182. Alternatively, orifice 185 can be opened to a wide-open or to a large diameter position so that the resistance to flow of oil by orifice 185 is relatively low (close to the resistance provided by the lines themselves).

Solenoid valve operator 192 is coupled to computer 111 by electrical conductors 193 to enable valve 187 to be selectively opened or closed by the computer. In the closed position fluid flows from cylinder 152 through variable opening valve or orifice 185 as the arm descends.

While theoretically it may be possible through computer implementation to make changes to the cutting force and orifice size rapidly enough and in synchronism with the operation of enhancer 141, it is preferred and an important feature of the method and apparatus of the present invention to essentially open or bypass orifice 185 when enhancer 141 is operated and force-control the feeding of the saw with cylinder 151.

When valves 184 and 185 are not opened or bypassed, valve 184 and check valve 186 tend to resist rebound of the saw arm away from workpiece 123 in response to enhancer displacement, and orifice or valve 185 limits the rate at which arm 113 can fall back toward the workpiece.

When valve 187 is opened, however, fluid 181 bypasses variable valves 185 and 184 and check valve 186. Similarly, if both valves 184 and 185 are opened to a large diameter by the computer, this has the effect of substantially eliminating the restrictions to fluid flow. The saw arm and saw blade are thus gravity biased toward the workpiece by a net weight of the arm established and controlled by cylinder 151. Fluid 181 in circuit 154 is free to move between reservoir 182 and cylinder 152 as required by the dynamics of operation of cutting enhancer 141. Throughout this force-controlled feeding process, relieving regulator 158 will maintain the pre-set cutting force or vary the force as controlled by computer 111. Only the arm descent control orifices 184 and 185 will be opened or bypassed.

It should be noted that when conduit 168 is coupled to reservoir 182 the pressure in circuit 154 is also communicated back to circuit 153 so that a setting of regulator 158 is employed which reflects pressure in reservoir 182, as well as the pressure in cylinder 152, because both piston-cylinder assemblies 151 and 152 pressurize conduits 167 and 166.

If the operator wants to change or vary the rebound rate of arm 113 in one or both directions when the blade displacement assembly is operating, computer 111 can open valves 184 and 185 to a position short of wide open. Thus, instead of simply dumping working fluid 18 back and forth between reservoir 182 and cylinder 151, it is preferable to use valves 184 and 185 to control or slightly retard the movement of working fluid 181 as it moves between the reservoir and cylinder.

Computer 111, therefore, can be used to close valve 187 sufficiently that flow of fluid 181 back to reservoir 182 must pass through valves 184 and 185, and the computer can change the flow rate setting of valve 185 from the feed rate to another rate, usually a higher rate which is less than full open to the reservoir. As thus controlled by the computer, the arm will descend faster than the normal feed rate but slower than when bypassed or wide open.

Similarly, valve 184 can be closed down by the computer from a fully open position so as to retard fluid flow in the direction of cylinder 151 slightly to retard the upward motion of the arm slightly. Such computer adjustment of flow control valves 184 and 185 can be used to optimize or tune the arm reaction rate to maximize the effectiveness of displacement of the blade by assemblies 141.

Throughout enhancer operation, however, cylinder 151 limits the maximum force which is applied to the blade.

2. Variable Force Operation.

Once operating in the force-controlled domain, the method and apparatus of the present invention contemplates staying in that domain. Unlike prior art saws in which any variation of the feed rate during cutting is accomplished by changing the orifice size, the present invention makes such changes by varying the support force provided by cylinder 151.

It would be possible in the saw of FIG. 9 to reduce the orifice size to regain orifice control, but this approach immediately has the potential for the feed system to overload the blade. Substantially all variation of the feed rate of the saw of the present invention, therefore, is accomplished by varying the support force provided by cylinder 151 while maintaining the orifice at least as open as adjusted prior to cutting.

It is possible to open the orifice 185, even wider than its initial adjustment for thin cross sections, but such a change in orifice 185 is not normally required and adds little to the basic force-controlled principle, since in thick sections the effect of orifice 185 will already be negligible.

In most instances variation of the cutting rate during cutting will be accomplished in response to feedback sensors mounted to sense operating conditions or parameters of the saw and coupled to feed signals representing the same back to computer 111.

In a force-based feed mode, changes in the workpiece cross section generally are accommodated automatically by slowing or increasing of the feed rate. The total force of the blade remains constant and proximate the maximum blade capacity. Controller 111 normally will not be used to vary the support force of cylinder 151.

As the saw blade dulls, however, blade wander may require reduction of the saw feed rate below blade capacity. Even when force-based feeding, therefore, variation of the support force of cylinder 151 during the cut may be required. If feedback sensors, such as sensor means 201 in FIG. 9, are provided on blade guide assemblies 132 to sense the lateral deviation or wander of blade 119 during cutting, such feedback can be used to adjust (reduce) the feed rate until blade wander is within tolerable limits.

A strain gauge assembly can be used as sensor means 201 to sense lateral deflection of guide arms 132 and communicate signals representing deflection from a nominal position or range back to computer 111 through conductors 202. Since blade wander is directly proportional to the force on the blade, the feedback loop is inherently more accurate or is smaller than when an orifice change is made to correct for lateral deflection. Force-based variations in response to sensors which sense a force-based phenomenon inherently are superior to orifice variations which produce subsequent rebalancing of the saw arm weight between the workpiece and cylinder 152.

Another example of a force-based response to feedback involves progressive dulling of blade 119. As the saw blade dulls, it is possible to apply more force to the blade to maintain the cutting rate. The initial adjustment of force cylinder 151 for a sharp blade will not normally be at the maximum capacity of the blade. As the blade dulls, therefore, there normally will be some room to apply additional force to the blade.

Angle transducer 136 and a clock circuit in computer 111 can be used to sense the instantaneous arm descent rate, as well as to compare that rate with previous cuts. The overall time required to complete a cut can also be compared to previous cuts.

If dulling of blade 119 is sensed the support force provided by cylinder 151 can be reduced to increase the net force of arm 113 on the blade. When such force increases, there are at least three upper limits that also can be used to terminate further force increases used to overcome blade dulling. First, the computer can have a limit established by input by the operator as to maximum blade capacity. Second, the operator can input computer 111 as to the force at which the machine will stall. Third, sensor means 201 can provide feedback indicating that the increased force is resulting in lateral blade deflection beyond the permissible range.

Prior art systems have included torque sensing means which are coupled to control a feed orifice. This approach is disadvantageous in two respects as compared to the present invention. First, the torque on motor 196 will decrease as the blade dulls, which would cause the apparatus to slow feeding, instead of increasing it to overcome the dullness. Second, the orifice change will again produce dynamic shifting of the force between the workpiece and cylinder, instead of the more positive and direct control of the force which occurs with the saw and method of the present invention.

What is claimed is:

1. A method of cutting a workpiece with a band saw, said band saw having a movable carriage, a band saw blade mounted to said band saw for advancement to effect cutting, and said fluid control means coupled to control movement of said carriage during cutting of said workpiece, said fluid control means including an adjustable orifice means controlling the flow of a working fluid to control movement of said carriage and an adjustable support force means for providing a support force in a direction opposing and thereby controlling movement of said carriage, said method including the steps of: prior to cutting said workpiece, adjusting said fluid control means to control movement of said carriage when cutting thin sections of said workpiece and when cutting thick sections of said workpiece, and thereafter cutting said workpiece by advancing said blade and simultaneously moving said carriage as controlled by said fluid control means, wherein the improvement in said method comprises:

said step of adjusting said fluid control means is accomplished by adjusting said orifice means to control movement of said carriage when in said thin sections and by adjusting said support force means independently of said orifice means to control movement of said carriage in said thick sections; and during said cutting step, controlling the rate of movement of said carriage means by varying said support force means independently of said orifice means while maintaining said orifice means at least as open as adjusted prior to cutting to substantially prevent excess loading of said blade and said band saw by controlling said loading independently of the resistance of said workpiece to cutting.

2. The method as defined in claim 1 wherein said band saw includes sensor means coupled to provide feedback signals to said support force means as to a dynamic operating condition during cutting, and said method further comprises:

during cutting of said workpiece, varying the magnitude of said support force in response to said feedback signals.

3. The method as defined in claim 2 wherein said sensor means includes a sensor coupled to sense lateral deflection of said saw blade from a nominal position during cutting, and said method comprises:

increasing said support force during said varying step in response to feedback signals indicating increasing lateral deflection of said blade.

4. The method as defined in claim 2 wherein said sensor means includes means providing feedback as to the sharpness of said saw blade, and said method comprises:

decreasing said support force during said varying step in response to feedback indicating that said saw blade is becoming dull.

5. The method as defined in claim 4 wherein said sensor means includes a sensor coupled to sense lateral deflection of said saw blade from a nominal position during cutting and said method comprises:
   terminating said decreasing step in response to feedback signals indicating increasing lateral deflection of said blade.

6. The method as defined in claim 1 wherein said band saw includes cutting enhancer means coupled and operable to enhance saw blade cutting, and the additional step of:
   operating said enhancer means during said cutting step.

7. The method as defined in claim 6, and the step of:
   during operation of said enhancing means, bypassing said orifice means.

8. A method of cutting a workpiece with a band saw, said band saw having a movable carriage, a band saw blade mounted of said carriage for advancement to effect cutting, fluid control means coupled to control movement of said carriage during cutting of said workpiece, said fluid control means including an orifice means for controlling carriage feed rate and an adjustable support force means for providing a support force in a direction opposing and thereby controlling movement of said carriage, and sensor means mounted to said band saw and sensing an operating parameter of said band saw, said sensor means being coupled to provide feedback signals concerning said parameter to said fluid control means, said method including the steps of: prior to cutting said workpiece, adjusting said fluid control means to control movement of said carriage when cutting thick and thin sections of said workpiece, and thereafter cutting said workpiece by advancing said blade and simultaneously moving said carriage as controlled by said fluid control means, wherein the improvement in said method comprises:
   said adjusting step is accomplished by adjusting said orifice means to control cutting in thin sections of said workpiece and adjusting said force support means independently of said orifice means to control cutting in thick sections of said workpiece; and
   during said cutting step, controlling the rate of movement of said carriage means by varying said support force means independently of said orifice means in response to said feedback signals.

9. A method of cutting a workpiece with a band saw, said band saw having a movable carriage, a band saw blade mounted on said carriage for advancement to effect cutting, fluid control means coupled to control movement of said carriage during cutting of said workpiece, said fluid control means including an adjustable orifice means controlling the flow of a working fluid to control movement of said carriage and an adjustable support force means adjustable independently of said orifice means for providing a support force in a direction opposing movement of said carriage, and cutting enhancer means coupled and operable to enhance the cutting rate, said method including the steps of: prior to cutting said workpiece, adjusting said orifice means to control movement of said carriage when cutting thin sections of said workpiece, prior to cutting said workpiece adjusting said support force means to control movement of said carriage when cutting thick sections of said workpiece, and thereafter cutting said workpiece by advancing said blade and simultaneously moving said carriage as controlled by said fluid control means, wherein the improvement in said method comprises:
   during said cutting step, operating said enhancer means, and controlling the rate of movement of said carriage means by adjusting said support force means independently of said orifice means while simultaneously maintaining said orifice means as adjusted prior to cutting.

10. The method as defined in claim 9 wherein,
    said step of operating said enhancer means is terminated prior to completion of said cutting step by tilting and maintaining said cutting stretch to an upwardly inclined position in the direction of advancement of said saw blade.

11. The method as defined in claim 9 wherein,
    said step of operating said enhancer means is accomplished by tilting a cutting stretch of said saw blades by simultaneously raising one end of said cutting stretch and bring another end of said cutting stretch to tilt said cutting stretch about a center of tilting located at about the transverse center of said workpiece.

12. A band saw having a movable carriage, a band saw blade mounted on said carriage for advancement to effect cutting, fluid control means coupled to control movement of said carriage during cutting and including adjustable support force means providing a selected support force in a direction opposing and thereby controlling movement of said carriage, and sensor means coupled to sense an operating parameter of said band saw during cutting of a workpiece, said sensor means providing feedback signals as to said parameter, wherein the improvement in said saw comprises:
   said sensor means is formed to sense lateral deflection of said saw blade from a nominal position during cutting to provide feedback as to a performance characteristic of said saw which indicates dulling of said saw blade; and
   said support force means being coupled to said sensor means and being responsive thereto to vary said support force provided thereby during cutting.

13. Band saw apparatus including a movable carriage, wheel means rotatably mounted to said carriage, an endless band saw blade mounted to said wheel means, a pair of relatively spaced-apart blade support assemblies carried by said carriage and engaging said blade at spaced-apart locations along said blade to define a cutting stretch therebetween, and displacement means formed to periodically displace said blade toward and away from said workpiece during cutting movement of said blade, wherein the improvement in said band saw apparatus comprises:
   said displacement means being mounted to each of said support assemblies and formed for displacement of a blade engaging portion of each of said support assemblies substantially simultaneously in opposite directions to produce alternating tilting of said cutting stretch relative to said carriage about a center of said tilting located between said support assemblies proximate a plane passing through the center of the cross section of said workpiece to enhance cutting by periodically reducing the area of said workpiece being engaged by said blade and to minimize displacement of said carriage in reaction to said tilting.

14. Band saw apparatus as defined in claim 13 wherein, said carriage is further substantially free for movement away from said workpiece in response to tilting of said saw blade, and said carriage is supported by means providing a support force against movement toward said workpiece in an amount which is established independently of the resistance to cutting of said workpiece.

15. Band saw apparatus as defined in claim 14 wherein,
said means providing a support force includes a fluid piston-cylinder assembly coupled between said carriage and a base of said band saw, and pressure control means coupled to a cylinder portion of said piston-cylinder assembly for control of the pressure of a working fluid therein.

16. Band saw apparatus as defined in claim 15 wherein, said pressure control means is a relieving regulator.

17. Band saw apparatus as defined in claim 16, and sensor means mounted to said band saw and sensing lateral deflection of said saw blade from a nominal position during cutting, said sensor means providing feedback signals upon sensing of said lateral deflection, and said means providing a support force being coupled to said sensor means and responsive to said feedback signals to vary said support force during cutting of said workpiece.

18. Band saw apparatus as defined in claim 14, and sensor means mounted to said band saw and sensing a decrease in sharpness of said saw blade, said sensor means providing feedback signals upon sensing of said decrease, and said means providing a support force being coupled to said sensor means and responsive to said feedback signals to change said support force.

* * * * *

UNITED STATES PATENT AND TRADEMARK OFFICE
CERTIFICATE OF CORRECTION

PATENT NO.  : 4,901,612
DATED       : February 20, 1990
INVENTOR(S) : Gerald R. Harris It is certified that error appears in the above-identified patent and that said Letters Patent is hereby corrected as shown below:

Col. 8, line 6, after "The" delete "us" and insert ---use---.

Col. 8, line 63, after "varying" delete "both" and insert ---both---.

Col. 13, line 16, delete "s" and insert ---so---.

Col. 13, line 63, after "angle" delete "a" and insert ---at---.

Col. 15, line 60, after "workpiece" delete "8" and insert ---81---.

Col. 17, line 39, delete "o" and insert ---or---.

Col. 20, line 47, after "valve" delete "19" and insert ---159---.

Col. 21, line 11, delete "weigh-t" and insert ---weight---.

Col. 22, line 21, after "force" delete "o" and insert ---on---.

Col. 22, line 32, delete "cutting-" and insert ---cutting---.

Col. 22, line 45, after "increased" delete "a" in first instance and insert ---as---.

UNITED STATES PATENT AND TRADEMARK OFFICE
CERTIFICATE OF CORRECTION

PATENT NO. : 4,901,612
DATED : February 20, 1990
INVENTOR(S) : Gerald R. Harris

It is certified that error appears in the above-identified patent and that said Letters Patent is hereby corrected as shown below:

Col. 26, line 29, delete "18" and insert ---181---.

Col. 29, line 15, delete "enhancing" and insert
---enhancer---.

Signed and Sealed this

Third Day of September, 1991

Attest:

HARRY F. MANBECK, JR.

*Attesting Officer*  *Commissioner of Patents and Trademarks*